J. A. BERRILL.
Paint Mill.
No. 88,360.
Patented March 30, 1869.
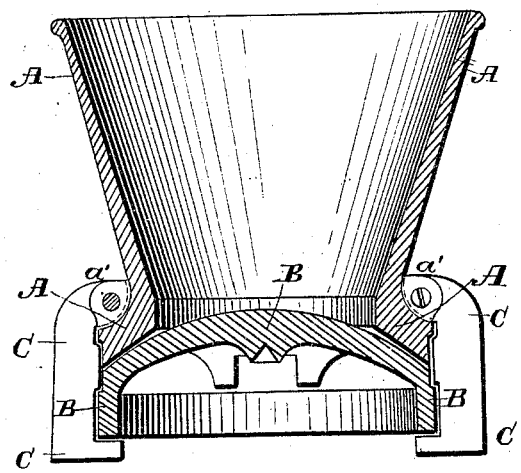
Witnesses:
Inventor:
J. A. Berrill

JOHN A. BERRILL, OF WATERVILLE, NEW YORK.

Letters Patent No. 88,360, dated March 30, 1869.

IMPROVED PAINT-MILL.

The Schedule referred to in these Letters Patent and making part of the same.

*To all whom it may concern:*

Be it known that I, JOHN A. BERRILL, of Waterville, in the county of Oneida, and State of New York, have invented a new and useful Improvement in Paint-Mills; and I do hereby declare that the following is a full, clear, and exact description thereof, which will enable others skilled in the art to make and use the same, reference being had to the accompanying drawing, forming part of this specification, in which the figure is a vertical section of a paint-mill, to which my improvement has been attached.

My invention has for its object to improve the construction of paint-mills, so that the ground paint may be more conveniently collected from the mill, and guided into the receiving-vessel; and It consists in the combination of two or more scrapers, with the hopper and runner of the mill, as hereinafter more fully described.

A is the hopper, upon the lower side of the flanged, or outwardly-projecting lower part of which is formed the upper, or stationary grinding-surface.

The hopper A is securely attached to a supporting frame-work, in the ordinary manner.

B is the movable part, or runner of the mill, which is constructed with and revolved by a spindle, in the ordinary manner.

The paint to be ground is put into the hopper A, and is ground while working its way out between the upper and lower grinding-surfaces, and flows down the outer surface of the runner B, into the receiving-vessel, or is thrown off from said outer surface by centrifugal force, falling into or over said vessel. To guard against this, I attach two or more scrapers, C, to the hopper, or stationary part A, which extend down along the outer surface of the runner B, and collect and scrape off the ground paint as it flows out from between the grinding-surfaces, and guides, or causes it to flow down into the receiving-vessel.

The scraper C may be attached by screws, or by bolts and nuts, to ears $a'$, formed upon the hopper A, or they may be detachably connected with said hopper in any other convenient and substantial manner.

The inner edges of the scraper C are so formed as to conform to the form of the outer surface of the runner B, and their lower ends should project under the lower edge of said runner, as shown in the figure.

By using two or more of the scrapers C, the paint is collected and removed, before so much has collected upon the surface of the revolving runner as to be in danger of flying off, or spattering.

Having thus described my invention,

I claim as new, and desire to secure by Letters Patent—

The combination of two or more scrapers C with the hopper A and runner B of a paint-mill, said scrapers C being attached to the hopper A, and their inner edges being made to correspond in form with the form of the outer surface of the runner B, substantially as herein shown and described, and for the purpose set forth.

JOHN A. BERRILL.

Witnesses:
   G. H. CHURCH,
   GEO. W. BERRILL.